March 12, 1946.  G. E. ROFF  2,396,532
TIRE CHAIN
Filed Oct. 16, 1942
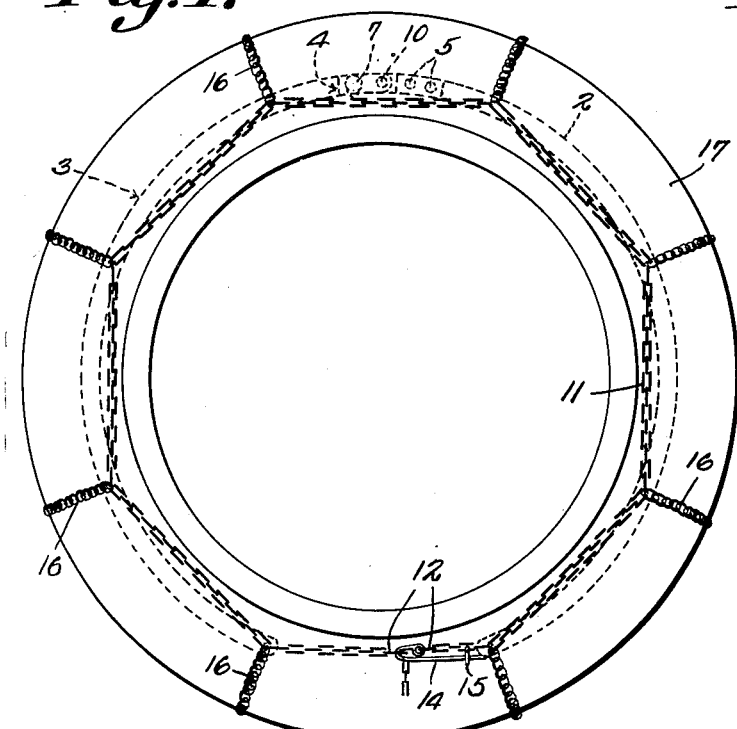
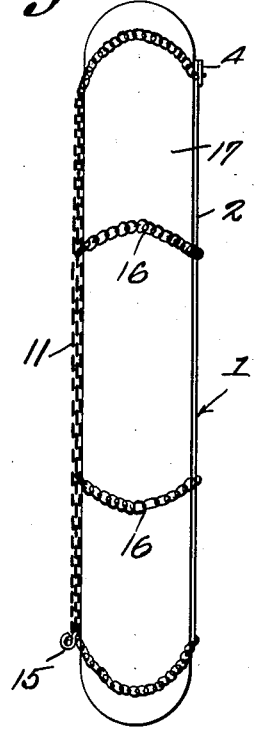
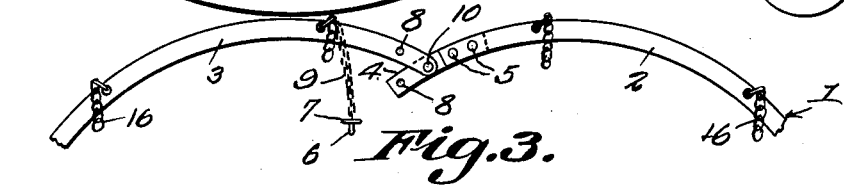
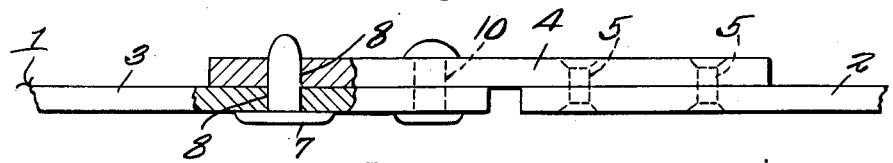
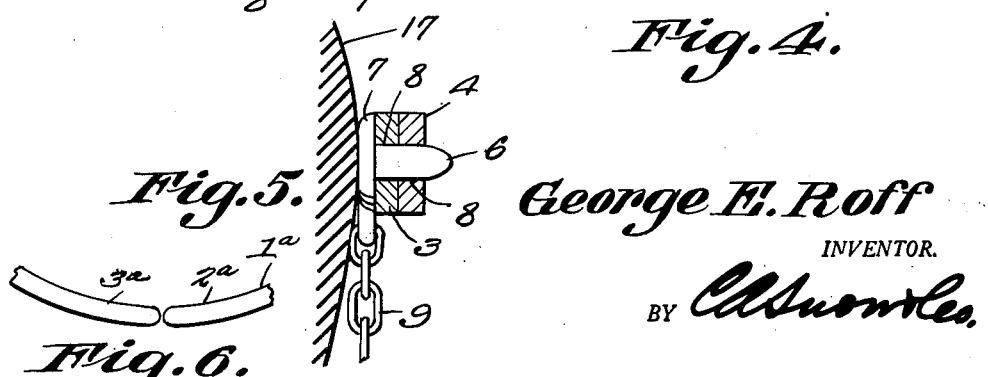
George E. Roff
INVENTOR.
BY

UNITED STATES PATENT OFFICE 2,396,532

TIRE CHAIN

George E. Roff, Goodland, Kans.

Application October 16, 1942, Serial No. 462,295

1 Claim. (Cl. 152—213)

This invention relates to anti-skid devices for vehicle tires, the particular type of article under consideration being that in which a more or less rigid member is located on the inner side of the tire, a circumferential side chain being located on the outer side of the tire, and said member and the side chain being connected by cross chains. The member referred to substantially defines a circle but may have a gap in its lower portion. The side chain has free ends and a means is provided for joining those ends together at the will of an operator. The aforesaid member is expanded, the ends of the side chains being free. The device is applied to a wheel from the outer side thereof. The said member is reduced in diameter and is held in that condition by various means, and the ends of the side chain are joined together. The object in view is to be able to apply an anti-skid device to a vehicle wheel, without jacking up the vehicle.

The device defined above, in general terms, is sound in principle, but it has not passed into common use because of structural defects.

For example, it has been proposed heretofore to interrupt the continuity of the inner member and to form it from resilient material, but such a construction is unsatisfactory because too much force is required to expand the said member prior to the mounting of it on a wheel. The member referred to has been formed of a plurality of parts, requiring more than one pivot or hinge joint for the opening and closing operation. This produces an undesirable weakness, and wherever there is a joint there must be some sort of a locking device to hold the parts rigid.

The problem seems to consist in forming the inner member with as few joints as possible, to wit one, and make that joint as strong as possible. To do that is one of the objects of the present invention. The invention goes farther, in that it proposes to employ the element which produces strength at the joint, as part of the mechanism which holds the inner member in rigid and operative condition.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawing:

Fig. 1 shows in side elevation, a device constructed in accordance with the invention, applied to a vehicle tire;

Fig. 2 is an elevation wherein the device is shown edgewise;

Fig. 3 is an elevation showing the inner member in open position, parts being broken away;

Fig. 4 is an enlarged plan showing the joint and locking device that connects the parts of the inner member;

Fig. 5 is a sectional view taken at right angles to the plane in which the wheel rotates;

Fig. 6 is a fragmental side elevation showing a modification.

The device forming the subject matter of this application preferably is made of metal throughout. In describing and claiming the invention, the words "upper" and "lower" are used merely for the sake of convenience, and refer to the article as it appears on the tire in Fig. 1.

The device includes an inner member 1, made up of two rigid, curved parts 2 and 3, substantially defining a circle, and oblong in cross section as Fig. 5 shows. The lower or first ends of the parts 2 and 3 are spaced apart slightly, as shown in dotted lines in Fig. 1.

A laterally offset finger 4 is carried by the second or upper portion of the curved part 2 and may be attached thereto by securing elements 5, such as rivets. The finger 4 extends circumferentially beyond the upper portion of the curved part 2, into overlapped relation with respect to the part 3 of the member 1, as disclosed in Fig. 4.

A releasable locking device connects the finger 4 with the curved part 3 and may be a pin 6, having a flattened head 7 at its inner end, the pin being insertible through registering openings 8 in the finger 4 and in the curved part 3. The pin 6 may be attached by a flexible element 9, to any desired part of the device, in order that the pin may be at hand when needed.

A pivot element 10 connects the finger 4 with the curved part 3 and is located between the pin holes 8 and the upper end portion of the curved part 2.

The device includes a flexible, circumferential, outer member 11, preferably a chain, having its lower ends 12 free. The ends 12 of the outer member 11, however, may be connected by a common lever hook 14 and a holding link 15, or in any other preferred manner.

Cross pieces, such as tread chains 16, connect the inner member 1 with the outer member 11. The links of the various chains may be constructed as desired and may be interengaged as the manufacturer desires.

The lever hook 14 is cast off, to free the ends 12 of the outer member 11, and the pin 6 is withdrawn from the holes 8 in the finger 4 and in the curved part 3, the inner member 1 being opened, as shown in Fig. 3. The inner member is introduced between the tire 17 and the mud-guard (not shown). The inner member 1 is closed, on the pivot element 10, to form part of a circle, and the pin 6 is inserted through the holes 8, to hold the inner member 1 rigid. The head 7 of the pin 6 comes into contact with the inner side of the tire 17, as shown in Fig. 5, and, consequently, the pin cannot escape from the holes 8. The ends 12 of the outer member 11 are connected by means of the lever hook 14 and the holding link 15, and the device is ready for use.

Owing to the fact that the ends 12 of the outer member 11 are separably connected, and because the lower ends of the parts 2 and 3 of the member 1 are spaced apart, the device may be placed on a tire without jacking up the vehicle, even though the tire 17 may have settled somewhat into the mud.

In the modification shown in Fig. 6, the parts 2a and 3a of the inner member 1a substantially define a circle, as in the form of Fig. 1, but the lower ends of the parts 2a and 3a are in contact or nearly so. This form may be used on a dry road or in a garage. In the form under discussion, the cross chains may be distributed as the modified structure may require.

What is claimed is:

An anti-skid device for vehicle tires, including an inner member made up of two rigid curved parts, substantially defining a circle, said parts having first end portions which are at all times free of each other, said parts having second end portions disposed approximately 180 degrees from the first end portions, one of the second end portions having a circumferential, laterally offset finger overlapping the other second end portion, a pivot element connecting the finger with said other second end portion, to permit the rigid parts to be opened and closed, a chain constituting the outer member of the anti-skid device and having free ends, means for connecting those ends releasably, cross pieces connecting the inner and outer members, the rigidity of said parts of the inner member, and the pivotal connection, rendering the inner member effective as a means for opening and closing the outer member, the chain construction of the outer member causing it to offer practically no resistance to the opening and closing of it by means of the inner member, the finger and said other second end portion having openings, and a locking pin of such diameter that it may be inserted outwardly through the openings, the pin having an enlarged head at its inner end, the cross pieces being short enough so that the head will engage the side wall of a tire whereon the device is mounted, the tire then constituting the sole means which holds the pin in place, the outer end of the pin being free.

GEORGE E. ROFF.